(12) United States Patent
Lin

(10) Patent No.: US 12,479,308 B2
(45) Date of Patent: Nov. 25, 2025

(54) ELECTRIC VEHICLE CHARGING SYSTEM CAPABLE OF GENERATING ELECTRICITY BY SOLAR ENERGY

(71) Applicant: Meixia Zhong, Guangzhou (CN)

(72) Inventor: Haosheng Lin, Guangzhou (CN)

(73) Assignee: Meixia Zhong, Guangzhou (CN)

( * ) Notice: Subject to any disclaimer, the term of this patent is extended or adjusted under 35 U.S.C. 154(b) by 570 days.

(21) Appl. No.: 18/152,125

(22) Filed: Jan. 9, 2023

(65) Prior Publication Data

US 2023/0158893 A1 May 25, 2023

Related U.S. Application Data

(63) Continuation of application No. PCT/CN2021/105745, filed on Jul. 12, 2021.

(30) Foreign Application Priority Data

Jul. 19, 2020 (CN) .......................... 202010695022.X
Jul. 19, 2020 (CN) .......................... 202021419593.2

(51) Int. Cl.
*B60L 8/00* (2006.01)
*H02J 7/35* (2006.01)

(52) U.S. Cl.
CPC .............. *B60L 8/003* (2013.01); *H02J 7/35* (2013.01); *H02J 2300/24* (2020.01)

(58) Field of Classification Search
CPC ...... B60L 53/20; B60L 8/003; H02J 2300/24; H02J 2310/48; H02J 7/35
See application file for complete search history.

(56) References Cited

U.S. PATENT DOCUMENTS

| | | | |
|---|---|---|---|
| 10,439,549 B2 * | 10/2019 | Kurlagunda | ............ H02S 20/30 |
| 2012/0074892 A1 | 3/2012 | Wu et al. | |
| 2017/0038417 A1 * | 2/2017 | Nakagawa | ............ G07C 5/008 |

FOREIGN PATENT DOCUMENTS

| | | |
|---|---|---|
| CN | 204706909 U | 10/2015 |
| CN | 106487324 A | 3/2017 |
| CN | 106985677 A | 7/2017 |

(Continued)

OTHER PUBLICATIONS

Internation Search Report of PCT/CN2021/105745, Mailed Sep. 29, 2021.

*Primary Examiner* — Julian D Huffman
*Assistant Examiner* — Sadia Kousar

(57) ABSTRACT

Provided is an electric vehicle charging system capable of generating electricity by solar energy comprising a roof capable of generating electricity under illumination, a movable solar panel, a solar panel state control device, and an intelligent voltage conversion and control module. The solar panel state control device is connected to the intelligent voltage conversion and control module, and controls stretched and contracted states of the movable solar panel, output voltages of the roof capable of generating electricity and the movable solar panel are connected in parallel, and then are connected to the intelligent voltage conversion and control module, an output voltage of the intelligent voltage conversion and control module is used for charging a power battery of the electric vehicle, and the solar panel is controlled to generate a maximum conversion rate and a maximum power in real time to charge the power battery.

3 Claims, 14 Drawing Sheets

(56) References Cited

FOREIGN PATENT DOCUMENTS

| | | |
|---|---|---|
| CN | 107640037 A | 1/2018 |
| CN | 210101337 U | 2/2020 |
| CN | 213383888 U | 6/2021 |
| CN | 213534454 U | 6/2021 |
| CN | 213534455 U | 6/2021 |

* cited by examiner

ELECTRIC VEHICLE CHARGING SYSTEM CAPABLE OF GENERATING ELECTRICITY BY SOLAR ENERGY

This application is a continuation of International Patent Application No. PCT/CN2021/105745 with a filing date of Jul. 12, 2021, designating the United States, now pending, and further claims priority to Chinese Patent Application No. 202010695022.X with a filing date of Jul. 19, 2020, Chinese Patent Application No. 202021419593.2 with a filing date of Jul. 19, 2020. The content of the aforementioned applications, including any intervening amendments thereto, are incorporated herein by reference.

TECHNICAL FIELD

The present invention belongs to the technical field of electric vehicle or hybrid electric vehicle charging, and more particularly relates to a charging system capable of generating electricity by solar energy and efficiently and practically assisting in charging an electric vehicle and a control method.

BACKGROUND OF THE PRESENT INVENTION

With the enhancement of social awareness of environmental protection and some obvious advantages of electric vehicles, the number of electric vehicles used is increasing rapidly, but the charging problems of the electric vehicles have also received great attention. On one hand, a fast charging current is large, a load is large, and one charging station has a great load impact on the national power grid. On the other hand, the charging of the electric vehicle is relatively troublesome, and many charging problems have not been completely solved. Particularly, parking spaces of many families are failed to be provided with charging piles, and there are very fewer number of charging stations in some places, but it is often necessary to plug and charge the electric vehicle, so that it is relatively troublesome to use, which has always troubled consumers and the use convenience of the vehicle, thus limiting the popularization of the electric vehicle.

In addition, there are many shortcomings in the existing solar charging system design, such as a small electricity generation area, or a lack of control, a low conversion rate, a small electricity generation capacity, or inability to dock with an actual electric vehicle, inability to charge a battery of the actual electric vehicle, a lack of practicality, and inability to be applied and popularized in actual life consumption, and the details are as follows.
1. In most solar charging systems, solar panels are limited by vehicle body areas, so the total electricity generation areas of the solar panels are small, and the electricity generation capacity is relatively small theoretically. In addition, in some related solutions of enlarging the solar panel, there is a lack of a state control device of the solar panel capable of being applied in practice, and the enlarged solar panel affects the appearance or normal running of the vehicle, which lacks the feasibility for actual manufacturing or mounting. Especially for an electric vehicle with a small roof area, the electricity generation area of the solar panel is smaller fundamentally, which limits a potential electric power generated by the solar panel, and makes the electricity generation capacity and the charging capacity by the solar energy small fundamentally.
2. The sampled solar panel increases wind resistance, changes an appearance of a top portion of the vehicle to a certain extent, and also affects the aesthetics of the vehicle for some users.
3. In the design of other solar systems, the area of the solar panel is increased, but is not specified to an electricity panel generation characteristic of the solar panel, which lacks voltage conversion and maximum power computing control, and is failed to effectively control the solar panel to be in a maximum power electricity generation state, resulting in serious reduction of the conversion efficiency and the electricity generation capacity, significantly reduced electricity generation power, and a poor electricity generation effect, which are very serious problems and key shortcomings leading to a situation that the charging capacity cannot meet actual application requirements.
4. When the electricity generated by the solar panel or the converted voltage cannot be used to directly charge the power battery, the previous solar charging solutions lacks communication docking and control functions, cannot dock and charge the actual vehicle, cannot solve the practical use problem of solar charging, and is failed to be applied to actual charging.
5. In addition, the electric vehicles require very high charging requirements and safety levels. In a battery application of the electric vehicles with extremely high safety, there is a lack of an independent voltage detection and monitoring process in an extra solar charging solution in the past, which was easy to cause a damage to the battery due to overcharging, or cause a safety problem of the battery.

The above shortcomings have become the bottlenecks of applying the solar electricity generation charging to assist in charging the actual electric vehicle, resulting in the failure to popularize solar auxiliary charging. To comprehensively solve the above shortcomings, to urgently rectify and integrate the solutions has become an urgent problem to be comprehensively solved.

SUMMARY OF PRESENT INVENTION

In order to overcome the above shortcomings and solve the above technical problems, the present invention solves and integrates the existing problems and shortcomings with a complete and practical design. By adopting a roof capable of generating electricity, and adding a movable solar panel and a solar panel state control device in front of and behind the vehicle, the movable solar panel is hidden below the roof when the vehicle is in use, so that a charging system of the present invention not only flexibly increases an electricity generation area, but also completely keeps the original aesthetics and shape of the vehicle. In addition, by adding the intelligent voltage conversion and control module, a maximum conversion rate and power generation can be generated by real-time excitation control, so that an electricity generation capacity is close to the daily electricity consumption of the electric vehicle, a charging capacity reaches a practical level, and charging times of a vehicle owner to charging stations can be reduced. The present invention also adopts a charging controller, so that in actual application and life, the charging can be docked with an actual universal vehicle, so that solar charging is safer, and the manufacture or installation is feasible. The movable solar panel prevents a vehicle body from being exposed to the sun, which greatly reduces a temperature of the vehicle body in hot weather. To sum up, the solar charging system of the present invention reaches the daily practical level, lays a foundation for popularization, and realizes green charging.

In order to solve the above problems in the background art, and realize the system of the present invention, the technical solutions of the present invention are as follows.

An electric vehicle charging system capable of generating electricity by solar energy comprises a roof capable of generating electricity under illumination, a movable solar panel, a solar panel state control device, and an intelligent voltage conversion and control module, wherein:

the roof capable of generating electricity under illumination has elongated outlets at a front side and a rear side of the vehicle, and the movable solar panel is mounted below the roof capable of generating electricity, and is pushed out from the elongated outlets and extends to the front side and the rear side of the vehicle when generating electricity;

the solar panel state control device is connected to the intelligent voltage conversion and control module, is used for receiving a vehicle-mounted signal and a signal of the intelligent voltage conversion and control module, and controls a stretched or contracted state of the movable solar panel; and output voltages of the roof capable of generating electricity and the movable solar panel are connected in parallel, and the output voltage obtained by the parallel connection is connected to the intelligent voltage conversion and control module, a voltage output terminal of the intelligent voltage conversion and control module is connected to a charging port of the electric vehicle or a power battery of the electric vehicle, and the intelligent voltage conversion and control module is used for controlling the solar panel to generate a maximum conversion rate and a maximum charging power under different light intensities at different time periods to charge the power battery of the electric vehicle, and monitors a battery voltage;

the intelligent voltage conversion and control module comprises a MCU intelligent computing controller, a current inductor, a voltage value detection circuit, a voltage converter and a charging controller, the current inductor and the voltage value detection circuit respectively detect a charging current and a charging voltage, and are connected to the MCU intelligent computing controller, the MCU intelligent computing controller is connected to the voltage converter, an output of the voltage converter is linked with the charging controller, and the MCU intelligent computing controller controls the voltage converter to convert and generate different voltages under the same light intensity in a certain time period, calculates and memorizes different charging powers and parameters according to a voltage and a current passed pack, selects a parameter corresponding to the maximum power to control an output voltage of the voltage converter, and charges the power battery of the vehicle through the charging controller 45; and the voltage converter is a DC/DC voltage converter or DC/AC voltage converter, is controlled by the MCU intelligent computing controller, and is capable of outputting a continuously adjustable voltage.

The charging controller is a charging controller having handshake communication and control functions according to an interface standard of an original vehicle charging socket, an input terminal of the charging controller is connected to an output terminal of the voltage converter, and an output terminal of the charging controller is connected to an original DC charging port of the electric vehicle, or is connected to a cathode or an anode of the power battery, or is connected to an AC charging port of the electric vehicle to charge the electric vehicle; and the charging controller is also connected to the MCU intelligent computing controller, and the MCU intelligent computing controller controls the charging controller to start or stop charging.

The solar panel state control device comprises a driving structure driving the movable solar panel to stretch, contract and translate, a driving control module and a low-voltage 12-v rechargeable battery, the driving structure is connected to the driving control module, and the driving structure is mounted below the roof capable of generating electricity. The 12-v rechargeable battery is connected to the driving control module and the intelligent voltage conversion and control module respectively, and provides a power supply needed for working.

The driving control module comprises a vehicle-mounted signal input unit, a MCU controller and a motor controller, the MCU controller is connected to the vehicle-mounted signal input unit, and is used for receiving a signal instruction of the vehicle related to charging, the MCU controller is connected to the MCU intelligent computing controller, and is used for receiving charging state information, and the motor controller is connected to the MCU controller and the driving structure respectively.

The driving structure comprises a motor provided with a gear, a trunking guide rail and a transmission rack, the driving structure is hidden and fixed below the roof capable of generating electricity, the transmission rack is fixed below two sides of the movable solar panel, the motor is fixed below the trunking guide rail, and is meshed with the transmission rack through the gear of the motor, and the motor rotates to drive the movable solar panel to translate along the trunking guide rail.

The movable solar panel is divided into a front part and a rear part, each part is composed of a single-layer or multi-layer solar panel, and has a single-layer structure or a multi-layer superimposed structure; the roof capable of generating electricity under illumination has a layer of wafers capable of receiving light energy to generate electricity on an outer surface through a customized laminating process, and is used for absorbing light energy to generate electricity; and voltage output terminals of the roof capable of generating electricity and the movable solar panel (2) are respectively connected in series with a diode to prevent a current from flowing backwardly.

Compared with the prior art, the present invention has the beneficial effects as follows.

First of all, the present invention adopts the Roof capable of generating electricity under illumination, so that when the vehicle is in use, the appearance shape and aesthetic degree of the roof surface of the original electric vehicle are completely maintained, and the airflow resistance of the vehicle during rapid driving is reduced.

As the movable solar panel needs to pass through one elongated outlet when extending outward, according to the actual roof structure and surface conditions, the elongated outlets are designed at the front side and the rear side of the roof during manufacturing and production, which is more feasible and more beautiful when stretching to the front side and the rear side of the vehicle. On a limited vehicle body area, when the vehicle of the user is parked and stored in a parking space, this design not only expands the solar panel area, but also increases the electricity generation area of the solar panel fundamentally, and does not occupy or affect other parking spaces, and does not hinder the user from opening a vehicle door to enter and leave the vehicle. By adopting the solar panel state control device, when the vehicle is in use, the movable solar panels on the front side and the rear side of the vehicle can be stored under the roof capable of generating electricity, so that the vehicle body can completely keep the original aesthetics and appearance of the vehicle, and the driving of the vehicle is not affected.

On the basis of increasing the electricity generation area of the solar panel, the intelligent voltage conversion and control module controls the solar panel to generate the voltage with the maximum conversion rate and the maximum charging power under different light intensities in different time periods to charge the power battery of the electric vehicle, so that the charging power can further reach the practical level.

Through the charging controller having the handshake signal communication protocol function in the intelligent voltage conversion and control module, the converted voltage can be effectively connected with the charging port or internal control circuit of the electric vehicle, so as to actually charge the electric vehicle in daily application. At the same time, the intelligent voltage conversion and control module can monitor the charging voltage in real time, and ensure the charging safety when the electricity generation voltage of the solar panel and the voltage of the electric vehicle vary greatly.

With the above comprehensive effects, the charging capacity of the solar charging system of the present invention can reach the maximum value, meet the practical requirements and level of daily charging, and keep the original aesthetics and appearance of the vehicle body completely. The movable solar panels are extended to the front side and the rear side of the vehicle, which can effectively block part of the sunlight from illuminating the vehicle body, reduce the temperature of the vehicle body, and is easy to realize and manufacture in production, does not affect the parking and occupation position of the vehicle in application, and does not affect the artificial opening and closing of the door of the vehicle to enter and leave the vehicle.

DETAILED DESCRIPTION OF PREFERRED EMBODIMENTS

Figure 1:
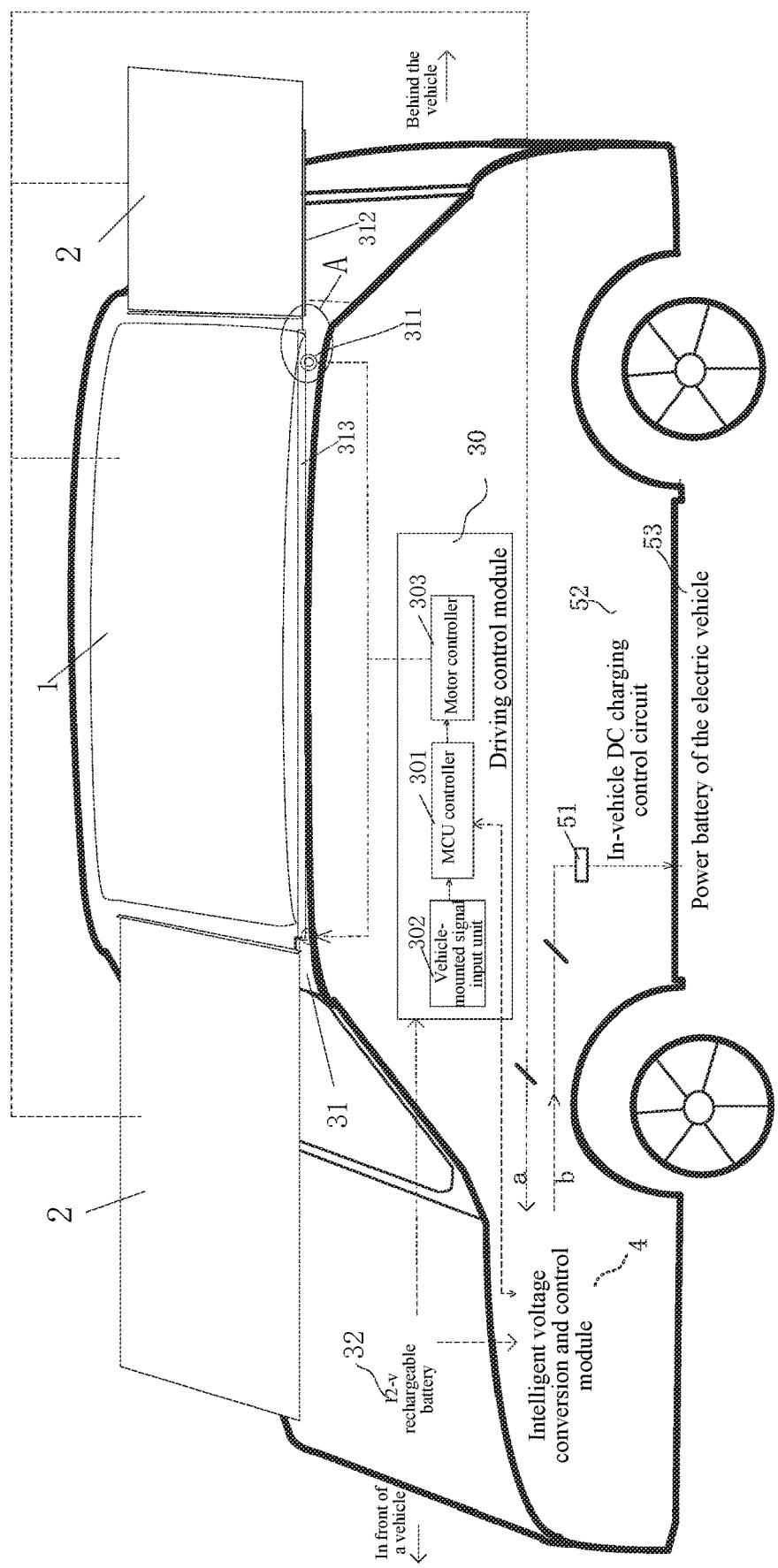
FIG. 1 is a schematic structural diagram of a first embodiment of the present invention.

To make the objects, technical solutions, and advantages of the present invention clearer, the present invention will be further described in details hereinafter with reference to the accompanying drawings and embodiments.

As shown in FIG. 1, FIG. 2, FIG. 7 and FIG. 10, an electric vehicle charging system capable of generating electricity by solar energy according to a first embodiment of the present invention is provided, which comprises a roof 1 capable of generating electricity under illumination, a movable solar panel 2, a solar panel state control device 3, and an intelligent voltage conversion and control module 4. The roof 1 capable of generating electricity under illumination has elongated outlets 56 at a front side and a rear side of the vehicle, and the movable solar panel 2 is mounted below the roof 1 and above a ceiling F in the vehicle, and is pushed out from the elongated outlets 56 and extends to the front side and the rear side of the vehicle when generating electricity. The solar panel state control device 3 is connected to the intelligent voltage conversion and control module 4, is used for receiving a vehicle-mounted signal and a signal of the intelligent voltage conversion and control module 4, and controls a stretched or contracted state of the movable solar panel 2. Output voltages of the roof 1 capable of generating electricity and the movable solar panel 2 are connected in parallel, and the output voltage obtained by the parallel connection is connected to the intelligent voltage conversion and control module 4, a voltage output terminal b of the intelligent voltage conversion and control module 4 is connected to a DC charging port of the electric vehicle. The intelligent voltage conversion and control module 4 is used for converting an output voltage of the solar panel into a voltage for charging a power battery under different light intensities in different time periods, and controlling the solar panel to generate a maximum conversion rate and a maximum charging power in real time, is docked with the electric vehicle and controls charging, and monitors a charging process.

With the above integral structure, in the solar charging system of the present invention, the movable solar panel in push-pull mode is adopted, and the movable solar panel 2, which is usually contracted and hidden under the roof capable of generating electricity, is pushed out from the elongated outlets at the front side and the rear side of the roof, and is translated and extended to the front side and the rear side of the vehicle, thereby multiplying the irradiation area of the solar panel and expanding the electricity generation area. When the movable solar panel 2 contracts, the movable solar panel is hidden below the roof 1 capable of generating electricity, and only the roof 1 capable of generating electricity is kept to continue generating electricity, thus completely keeping the original appearance of the electric vehicle. On the basis of increasing the electricity generation area of the solar panel, the intelligent voltage conversion and control module 4 controls the solar panel to generate the voltage with the maximum conversion rate and the maximum charging power under different light intensities indifferent time periods to charge the power battery of the electric vehicle, so that the charging can further reach the practical level. Meanwhile, the intelligent voltage conversion and control module 4 realizes and effectively connects the converted voltage with the charging port or internal control circuit of the electric vehicle, so as to realize the connection charging of the electric vehicle in production and application. In actual production, the solar panel state control device 3 and the intelligent voltage conversion and control module 4 are hidden and mounted below the roof capable of generating electricity, or partially installed below a front cover of the vehicle.

The present invention can enlarge the illumination area of the solar panel, keep the original appearance and shape of the vehicle, control the solar panel to be in the state of maximum conversion rate and maximum electricity generation power, realize the effective connection with the electric vehicle, realize the maximum charging power to charge the power battery, and keep the aesthetics.

Each structural part of the present invention will be described in detail hereinafter with reference to the first embodiment and the corresponding drawings, and the details are as follows.

Figure 2:
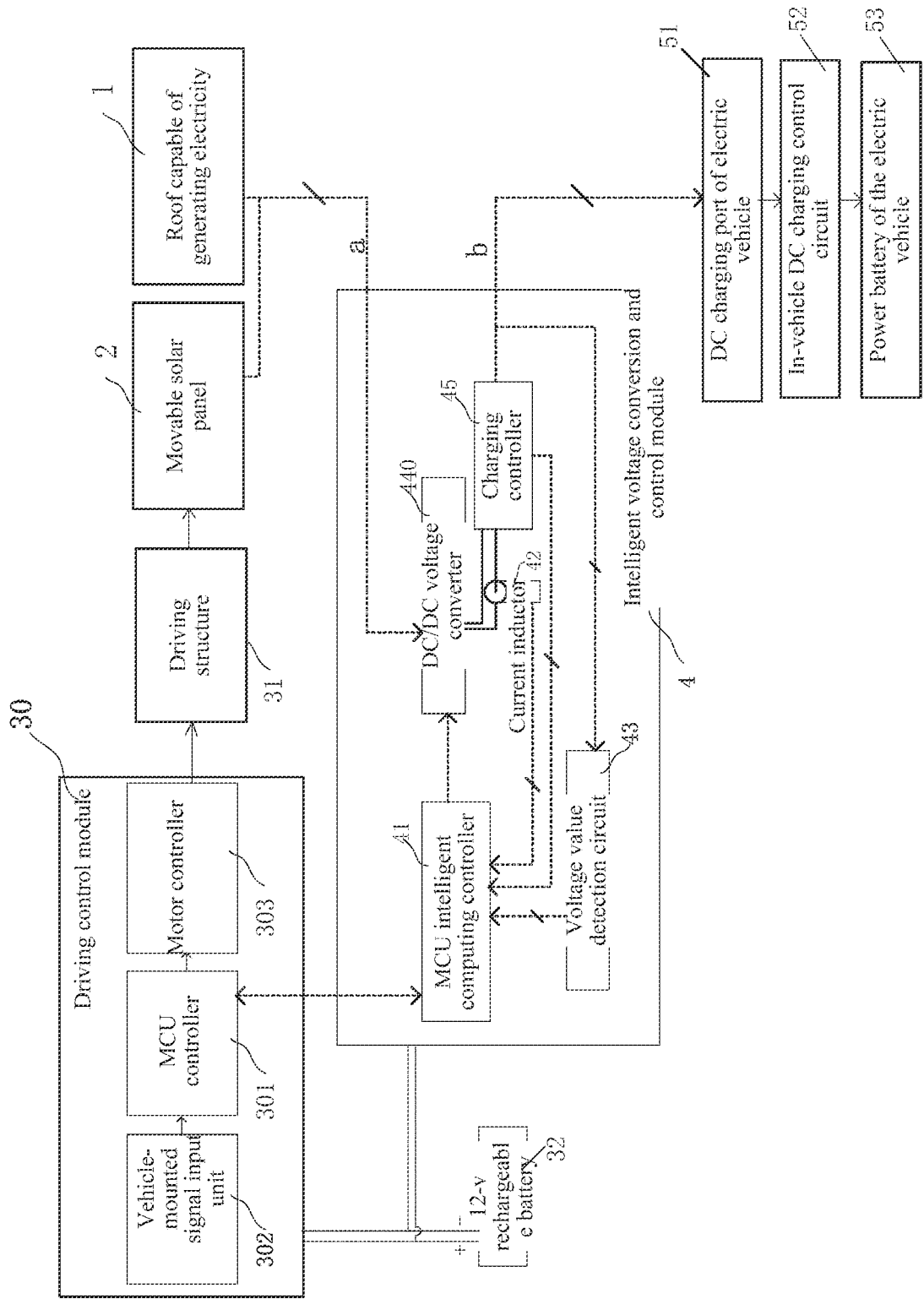
FIG. 2 is a principle topology schematic diagram of the first embodiment of the present invention.

As shown in FIG. 1 and FIG. 2, in the embodiment of the electric vehicle charging system capable of generating electricity by solar energy, the solar panel state control device 3 comprises a driving structure 31 driving the movable solar panel to stretch, contract and translate, a driving control module 30 and a 12-v rechargeable battery 32. The driving structure 31 is connected to the driving control module 30, and the driving structure 31 is mounted below the roof 1 capable of generating electricity. The 12-v rechargeable battery 32 is connected to the driving control module 30 and the intelligent voltage conversion and control module 4 respectively, and provides a power supply needed for working.

With the above structure, the present invention controls the driving structure 31 through the driving control module 30, and when parking, the driving structure drives the movable solar panel to translate, so that the movable solar panel extends to the front side of the vehicle and the rear side of the vehicle, which does not occupy the parking spaces on the left and right sides and does not affect people getting on and off the vehicle. Before driving, the driving structure drives the movable solar panel to contract and hide below the roof capable of generating electricity, which will not affect the normal driving of the vehicle and completely keep the original shape of the vehicle.

Figure 10:
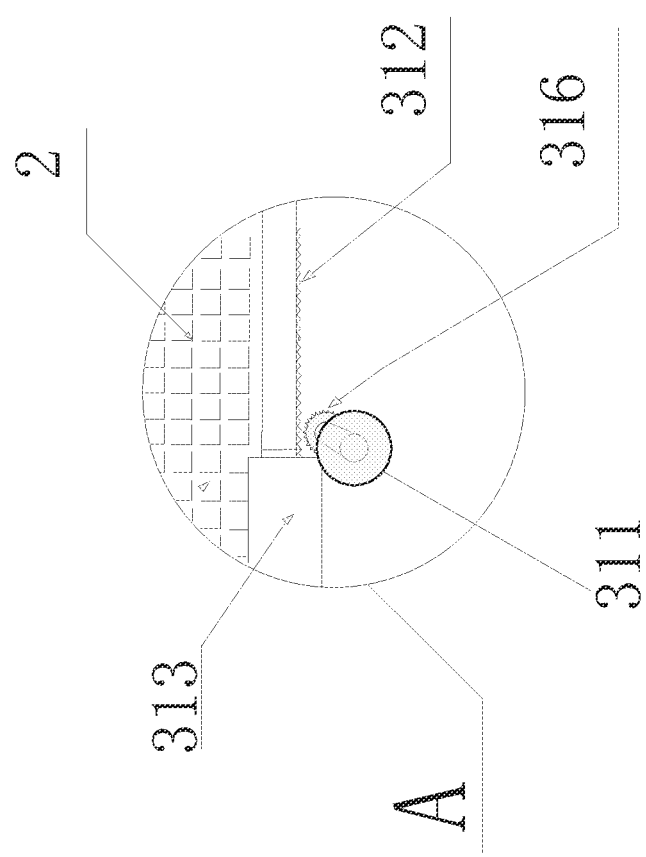
FIG. 10 and FIG. 11 are enlarged drawings of part A in FIG. 1, FIG. 3 and FIG. 5 of the present invention.

As shown in the enlarged view of FIG. 10, in the electric vehicle charging system capable of generating electricity by solar energy, the driving structure 31 comprises a motor 311 provided with a gear, a trunking guide rail 313 and a transmission rack 312. The trunking guide rail and the driving motor are both hidden and fixed below the roof 1 capable of generating electricity and above the ceiling F in the vehicle. The transmission rack 312 is fixed below the movable solar panel 2, the driving motor 311 is fixed at two ends of the trunking guide rail, and is meshed with the transmission rack 312 through the gear, and the motor rotates to drive the movable solar panel 2 to translate along the trunking guide rail. With the above driving structure, the gear can be rotated by the motor in the driving structure according to the present invention, thus driving the transmission rack, realizing the control of the movable solar panel to translate and expand, and extending to the front side and the rear side of the vehicle through the elongated outlet 56 on the front side of the roof and the elongated outlet 56 on the rear side of the roof capable of generating electricity.

Figure 11:
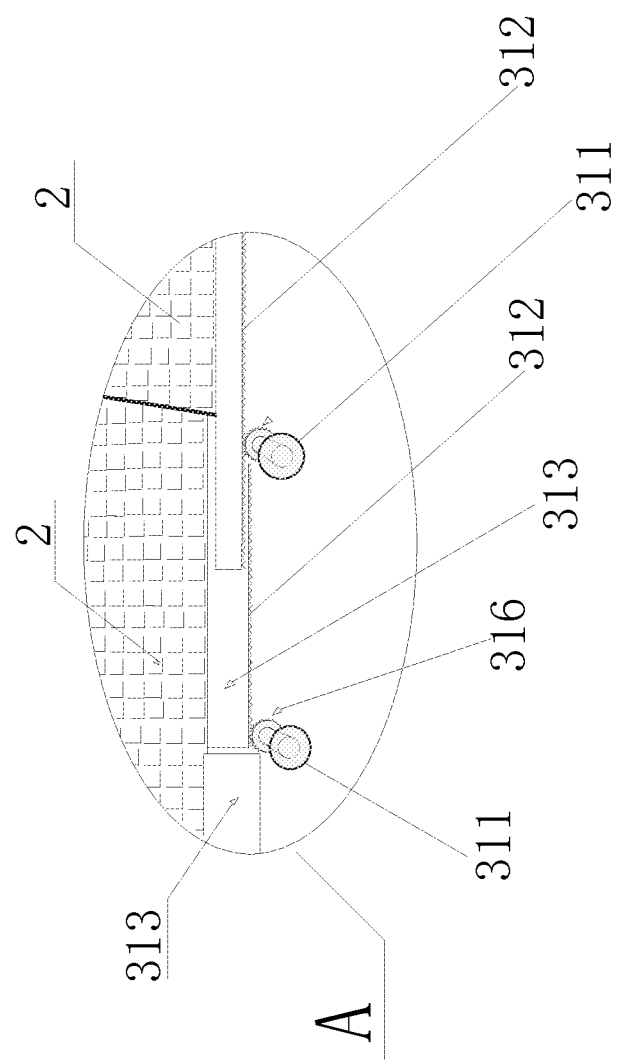
Figure 12:
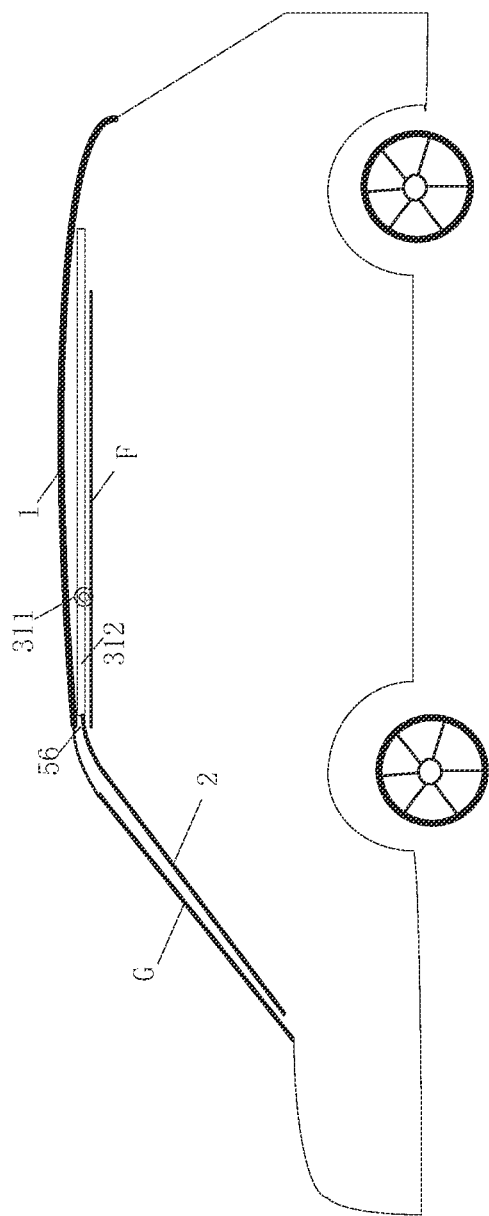
FIG. 12 and FIG. 13 are schematic structural diagrams of a movable solar panel 2 under a front windshield in the vehicle after being extended.
Figure 13:
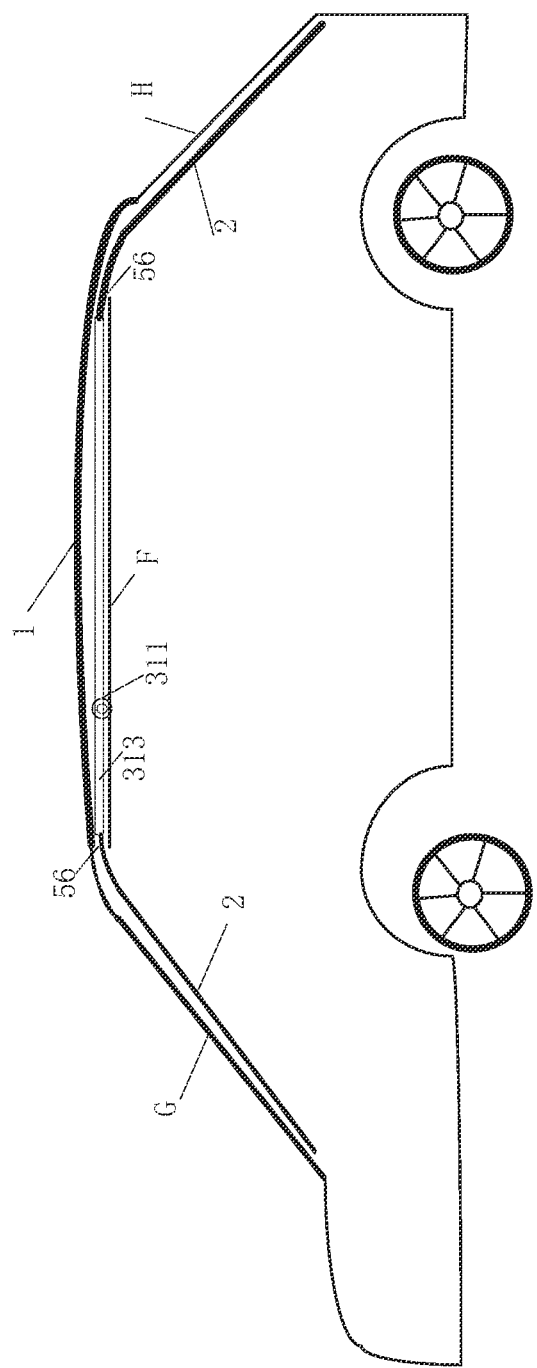
Figure 14:
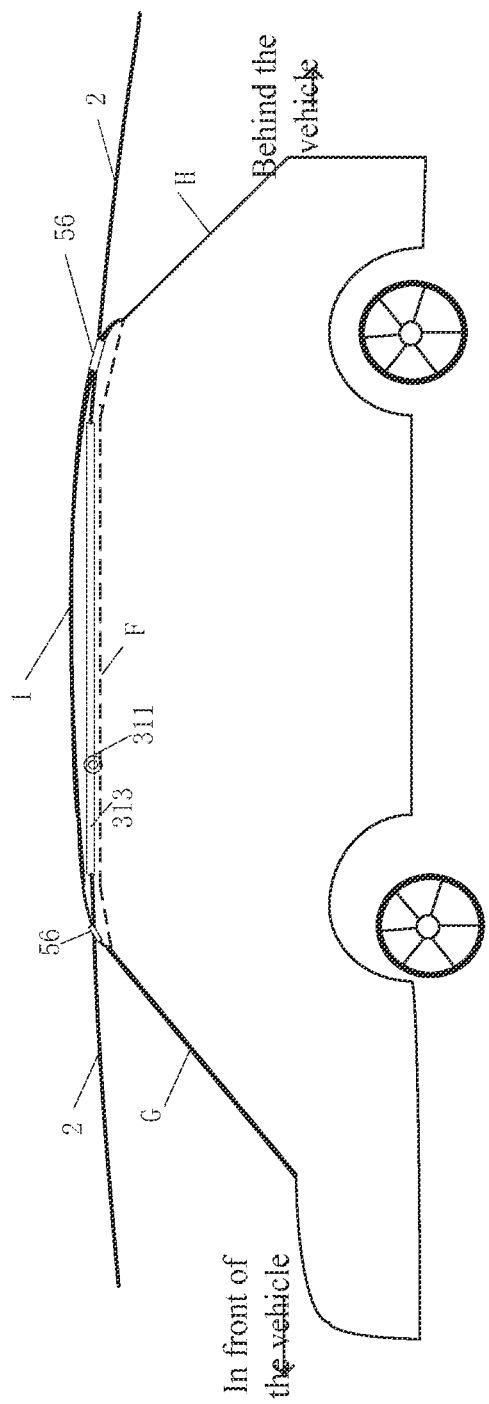
FIG. 14 is a schematic structural diagram of the movable solar panel 2 under a rear windshield in the vehicle after being extended.

In the actual production or mounting process, as shown in FIG. 1 and FIG. 14, when the elongated outlets 56 are located on front and rear surfaces of the roof and above the wind shields G and H, after the movable solar panel is pushed out from the elongated outlet, the movable solar panel is located above the wind shields. In the actual production, the elongated outlet is provided with a rain cover linked with the driving structure to prevent rainwater from entering the vehicle. Alternatively, as shown in FIG. 12 and FIG. 13, the elongated outlet on the front side of the roof may be modified to a junction of the front side of the roof 1 and the front side of the ceiling F in the vehicle, leaving a gap between the roof and the ceiling as the elongated outlet 56. The movable solar panel on the front side of the vehicle may be pushed out from the elongated outlet 56 on the junction of the front side of the roof and the front side of the ceiling in the vehicle. In this structure, the movable solar panel 2 is a single-layer flexible solar panel, and after extending, the movable solar panel on the front side of the vehicle will be located below the front wind shields G and H in the vehicle, which is conducive to maintaining the appearance and aesthetics of the vehicle when extending the movable solar panel. In the actual production process, the movable solar panel may be expanded to be composed of multi-layer movable solar panels, as shown in the enlarged drawing of FIG. 11. By adopting a multi-layer superimposed structure, the trunking guide rail is mounted on both sides of each solar panel. The trunking guide rail of next solar panel is embedded in the trunking guide rail of the previous solar panel. One end of the outer movable solar panel is fixed on the inner movable solar panel. When the motor is fixed at two ends of each trunking guide rail, and when the motor rotates, the gear drives the transmission rack, thereby driving the movable solar panel of next layer to translate.

In the electric vehicle charging system capable of generating electricity by solar energy as shown in the topology diagram of FIG. 2, the driving control module 30 comprises an on-board signal input unit 302, a MCU controller 301, and a motor controller 303. The MCU controller 301 is connected to the on-board signal input unit 302, and is used for receiving a signal instruction of the vehicle related to charging. The MCU controller 301 is connected to the MCU intelligent computing controller 41, and is used for receiving charging state information. The motor controller 303 is connected to the MCU controller 301 and the driving structure 31 respectively. The MCU controller receives the state information of the vehicle and artificial control information through the on-board signal input unit, and the MCU controller 301 can comprehensively and intelligently judge whether to extend the movable solar panel according to the state of the vehicle, an artificial instruction, an light intensity and a voltage state by combining information transmitted by the MCU intelligent computing controller 41. When the conditions are met and the solar panel area needs to be expanded, the MCU controller 301 controls the motor controller 303 to control the motor in the driving structure to rotate, so as to drive the movable solar panel to move forward and backward to expand the total electricity generation area by illumination. When the vehicle needs to be started for driving, or when it is required to fold the movable solar panel artificially, or when an external environment has poor illumination conditions, the movable solar panel will be automatically retracted and hidden under the roof 1 capable of generating electricity, thus completely keeping the appearance shape and aesthetics of the original vehicle. In this case, the roof 1 capable of generating electricity can still receive illumination to generate electricity and continue to charge the power battery during the driving process. In actual use, a control mode or instruction information may be given artificially through a switch or a remote control, and transmitted to the MCU controller 301 through the on-board signal input unit, so that the state of the solar panel can be forcibly controlled in a specific occasion or before the vehicle is used. In practical application, the on-board signal input unit may comprise a wireless transceiver module, which is used for receiving remote control signals or mobile phone monitoring signals, and send all charging information to a remote control terminal.

In actual production, the 12-v rechargeable battery may be an original low-voltage 12-v rechargeable battery of the vehicle, or may be an independent 12-v maintenance-free lead-acid battery. The battery is placed under the roof capable of generating electricity. While the intelligent voltage conversion and control module 4 charges the power battery, an output voltage of 14 v is also output through the internal voltage converter 44 to charge the 12-v rechargeable battery 32. Alternatively, in actual production, a switching power supply may also be used to take electricity from a cathode and an anode of the power battery, reduce the high voltage to a 12-v power supply, and then supply electricity to the driving control module 30, and supply electricity to the intelligent voltage conversion and control module to provide the power supply needed for working. In actual use, the MCU controller 31 of the solar panel state control device 3 comprehensively judges how to control the state of the solar panel according to a plurality of factors such as instruction requirements, and specifically controls the state of the movable solar panel according to the state factors such as vehicle-mounted signal requirements input by the vehicle, the electricity generation power from the intelligent voltage conversion and control module 4, and whether the voltage of the power battery detected is fully charged.

As shown in FIG. 1, in the embodiment of the electric vehicle charging system capable of generating electricity by solar energy, the roof 1 capable of generating electricity under illumination has a layer of wafers capable of receiving light energy to generate electricity on an outer surface through a customized laminating process, and is used for absorbing light energy to generate electricity. As shown in FIG. 12, in actual production or life applications, it is needed to only mount or only extend the movable solar panel 2 in the front side according to customer requirements, or the movable solar panels 2 in the front and rear sides may be installed or extended as shown in FIG. 13 and FIG. 14. Voltage output terminals of the roof 1 capable of generating electricity and the movable solar panel 2 are respectively connected in series with a diode to prevent a current from flowing backwardly. The voltage output terminals of the roof 1 capable of generating electricity and the movable solar panel 2 are connected in parallel and then connected to the voltage converter 44 of the intelligent voltage conversion and control module 4.

The specific embodiments above illustrate how to effectively expand the receiving area of the solar panel on the basis of a limited vehicle body area when parking, so as to increase the electricity generation area and keep the beautiful shape fundamentally. On the other hand, according to the characteristics of the solar panel, the output power of the solar panel will be greatly changed by the load under the same light intensity in the same time period, and the output power is not a fixed output power. Therefore, by controlling the voltage converter to output different voltages, and intelligently calculating and memorizing different powers, finding and controlling a maximum output power in real time, and realizing the connection charging of the electric vehicle through the charging controller, have become another necessary key point for the charging to reach the practical level. The specific implementation modes are as follows.

In the electric vehicle charging system capable of generating electricity by solar energy as shown in the topology diagram of FIG. 2, the intelligent voltage conversion and control module 4 comprises a MCU intelligent computing controller 41, a current inductor 42, a voltage value detection circuit 43, a voltage converter 44 and a charging controller 45. The current inductor and the voltage value detection circuit respectively detect a charging current and a charging voltage, and are connected to the MCU intelligent computing controller 41. The MCU intelligent computing controller 41 is connected to the voltage converter 44, and an output of the voltage converter 44 is linked with the charging controller 45. The MCU intelligent computing controller 41 controls the voltage converter to convert and generate different voltages under the same light intensity in the same time period, detects different charging currents and charging voltages through the current inductor and the voltage value detection circuit, calculates and memorizes different charging powers according to a calculation formula that the power $P=U*I$, and selects a voltage conversion parameter corresponding to the maximum power to output a charging voltage, charges the electric vehicle through the charging controller 45, and controls time period in real time to obtain the maximum conversion rate and the maximum charging power under the same light intensity.

With the above structure, the intelligent voltage conversion and control module 4 can calculate the maximum electricity generation power under a unit light intensity in a certain time period under the same light intensity, so as to judge the light intensity and send a light intensity signal to the solar panel state control device 3, and on other hand, can control the internal voltage converter 44 in real time, calculate and memorize different parameters to obtain the actual charging power, find and select the parameter corresponding to the maximum power, and control the voltage converter 44 to convert and output a voltage corresponding to the maximum charging power, so as to excite and control the solar panel to be in an output state with the maximum conversion rate and the maximum electricity generation power.

Figure 7:
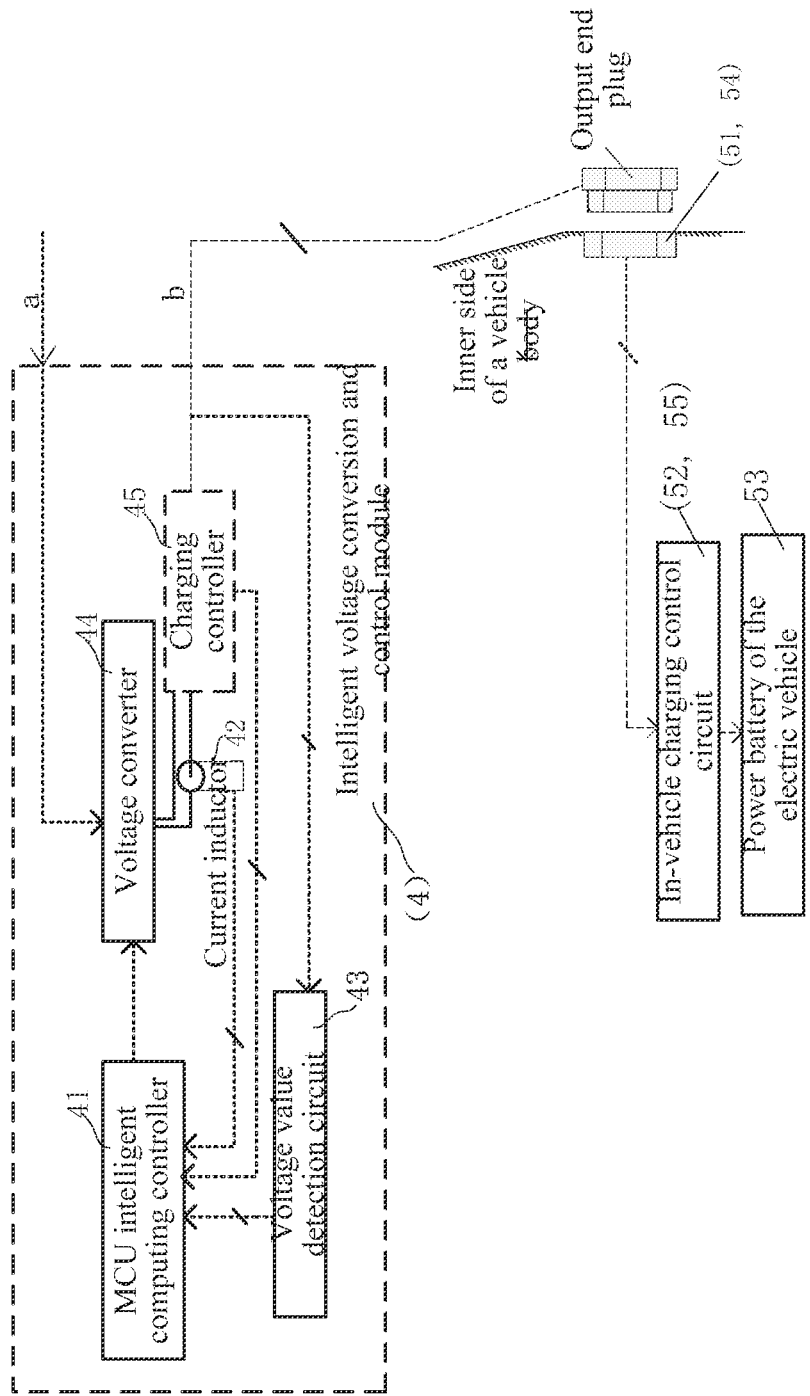
FIG. 7, FIG. 8 and FIG. 9 are three schematic structural diagrams of the charging connection between a charging controller and an electric vehicle.
Figure 8:
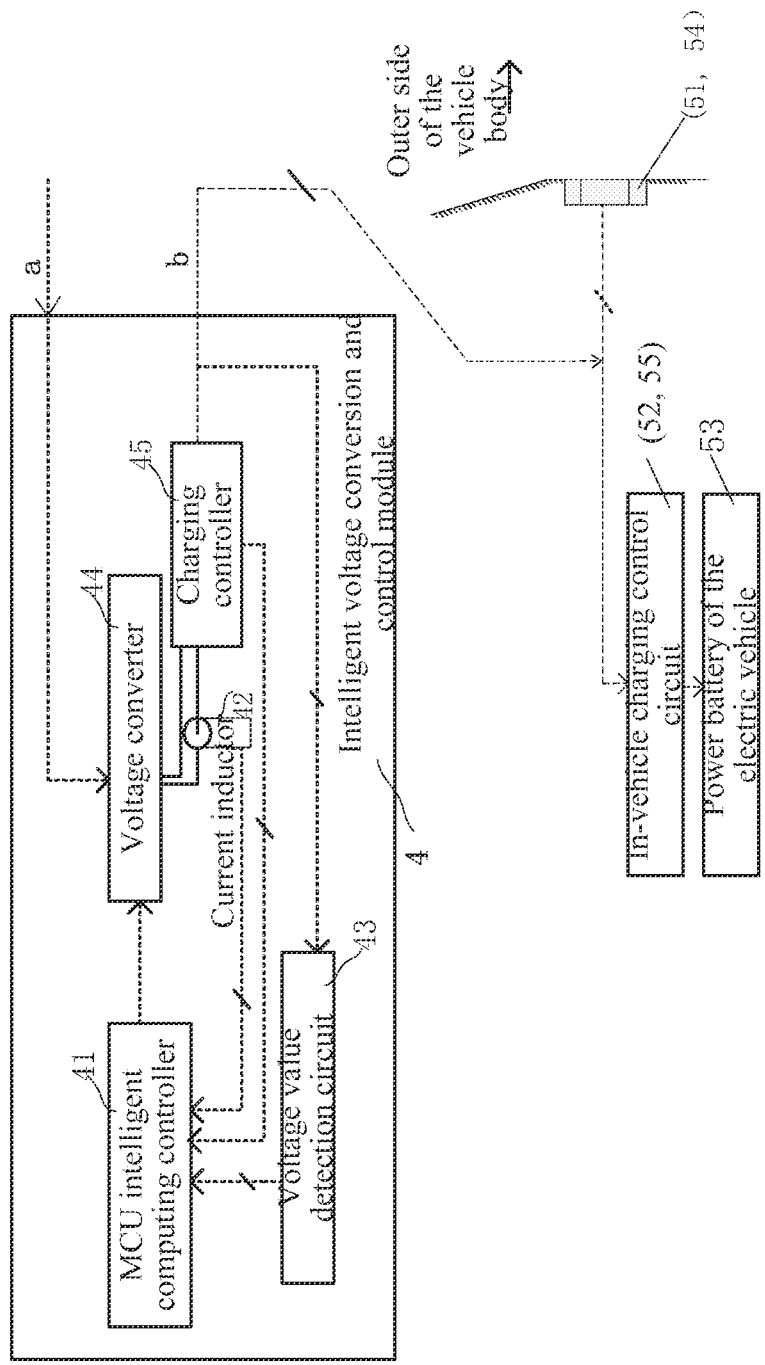

In the electric vehicle charging system capable of generating electricity by solar energy as shown in the topology diagram of FIG. 2, the voltage converter 44 is a DC/DC voltage converter 440, which is a voltage converter controlled by the MCU intelligent computing controller 41, and is capable of outputting a continuously adjustable voltage. The charging controller 45 is a charging controller having handshake communication and control functions according to an interface standard of an original vehicle DC charging socket. The charging controller 45 is connected to the voltage converter 44, and an output terminal b of the charging controller 45 is used as a voltage output terminal b of the intelligent voltage conversion and control module 4, and is connected to an original DC charging port 51 of the electric vehicle to charge the electric vehicle. According to the principle structure of the first embodiment of the present invention, a controllable and adjustable DC/DC voltage converter 440 is used in the voltage converter, and a voltage output by the voltage converter 440 enters the charging controller 45. The charging controller 45 comprises the handshake communication and control functions according to the original vehicle DC charging interface standard. The output terminal b of the charging controller 45 is connected with the DC charging port 51 of the electric vehicle through the following connection way. Preferably, as shown in FIG. 7, the tail end of the output terminal b is plugged into the charging port of the vehicle body by using a plug, or alternatively, as shown in FIG. 8, the output terminal b is connected to a rear end line of the charging socket. In actual production and application, or as further shown in FIG. 9, at an initial design stage of the vehicle, the charging socket is derived from a sub-charging access port built into the charging control circuit in the vehicle, and the output terminal b is connected to the sub-charging access port, thus being connected to a DC charging control circuit module 52 in the vehicle and integrated into a whole. In all the above ways, the output voltage of the charging controller 45 can charge the power battery of the electric vehicle through the charging control circuit in the vehicle.

The charging controller 45 is also connected to the MCU intelligent computing controller 41, and has the function of preventing voltage overshoot through mutual communication control. In the specific production and application, if the charging controller is connected to an internal circuit at a rear end of the charging port, the charging controller may send notification information to the MCU intelligent computing controller 41 when detecting charging or artificial uncovering a protective cover of the charging port, and the MCU intelligent computing controller 41 may send an instruction to control the voltage converter to stop inverting the voltage, and control the charging controller 45 to release the circuit connection with the charging port to prevent charging conflict. When the vehicle is fully charged, the charging controller 45 may notify the MCU intelligent computing controller 41 to stop solar electricity generation and charging. When the artificial external charging exits and the conditions are met, the connection with the internal circuit at the rear end of the charging port is restored, and the solar charging mode is restored.

Figure 3:
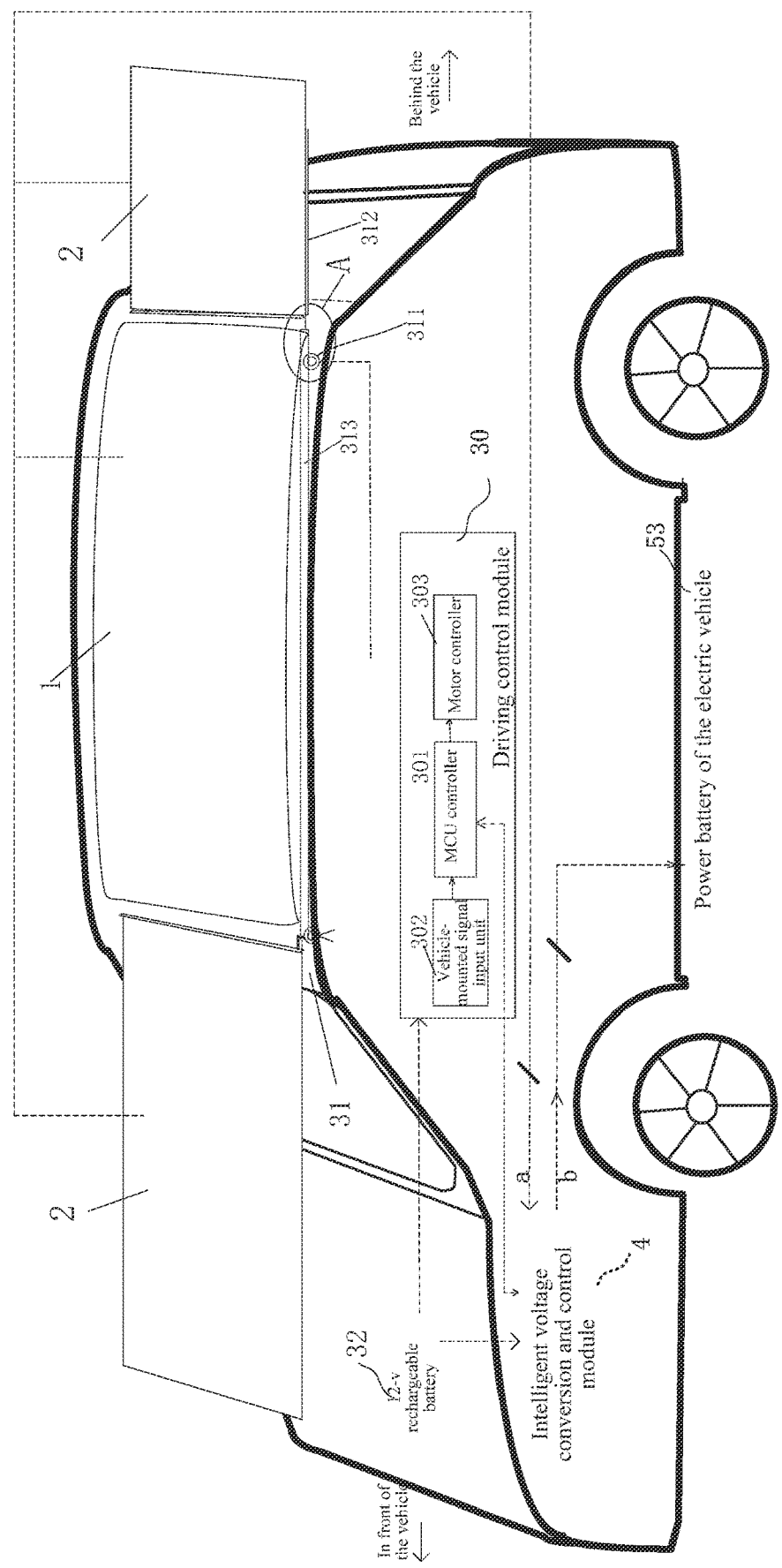
FIG. 3 is a schematic structural diagram of a second embodiment of the present invention.
Figure 4:
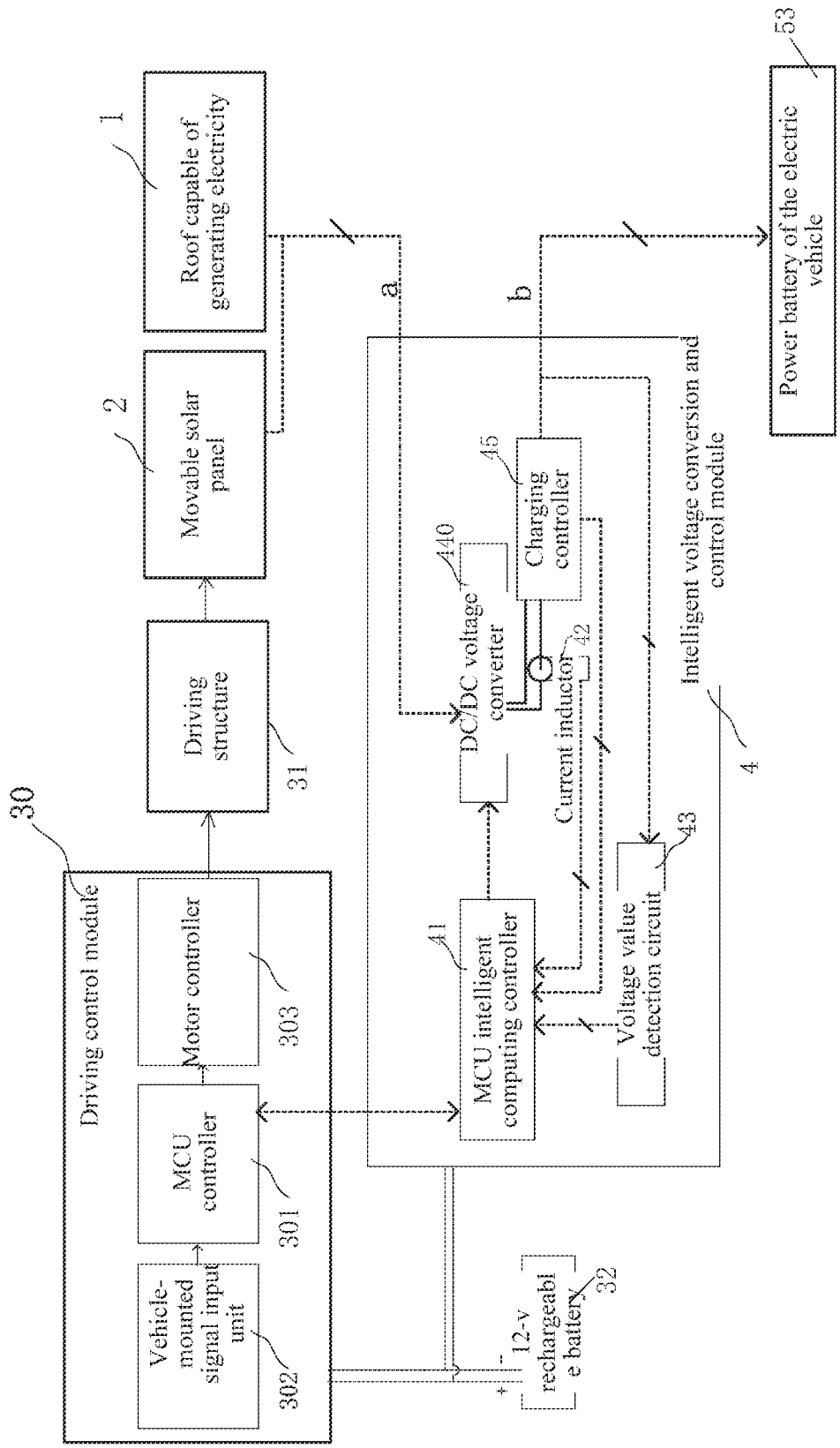
FIG. 4 is a principle topology schematic diagram of the second embodiment of the present invention.
Figure 5:
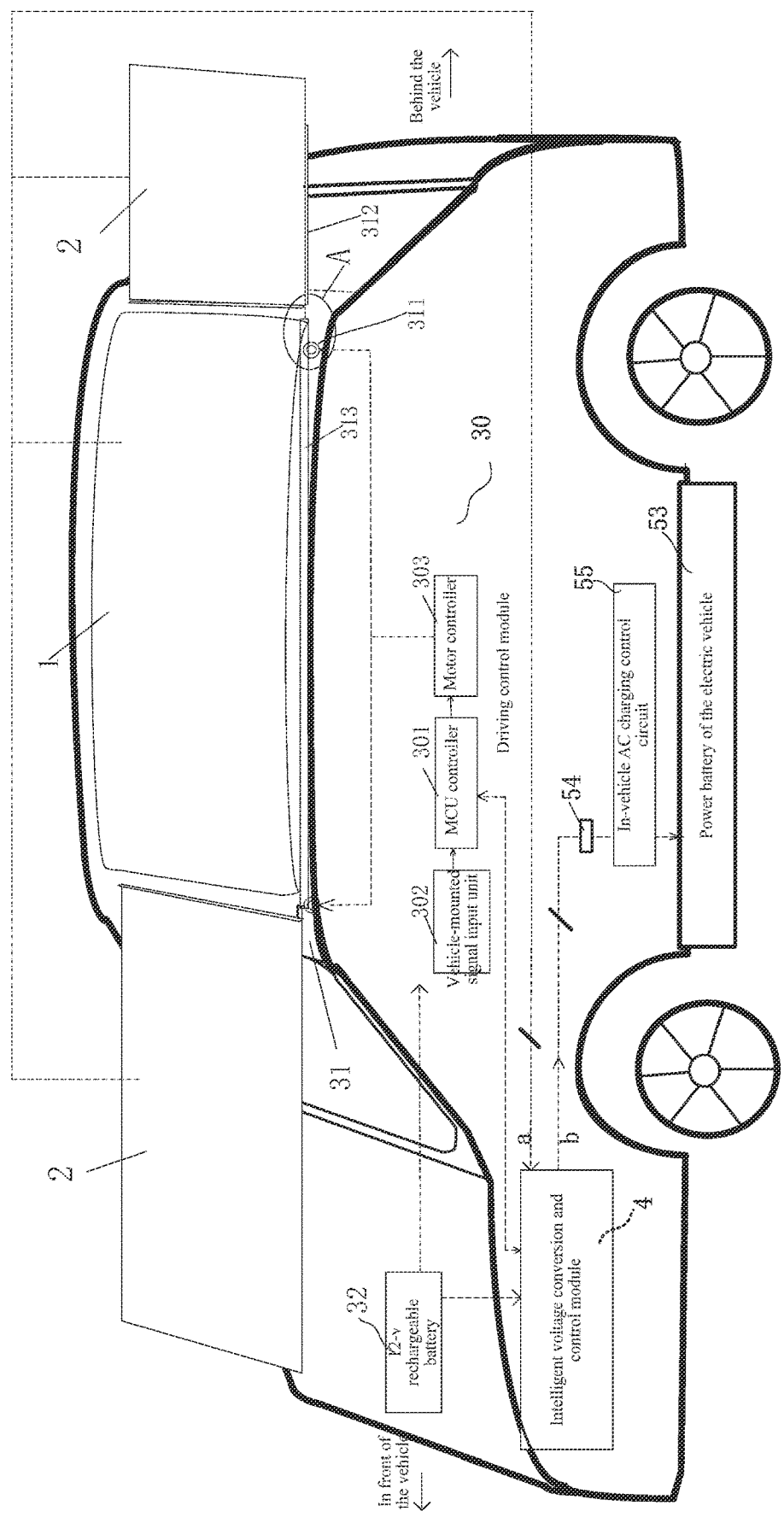
FIG. 5 is a schematic structural diagram of a third embodiment of the present invention.
Figure 6:
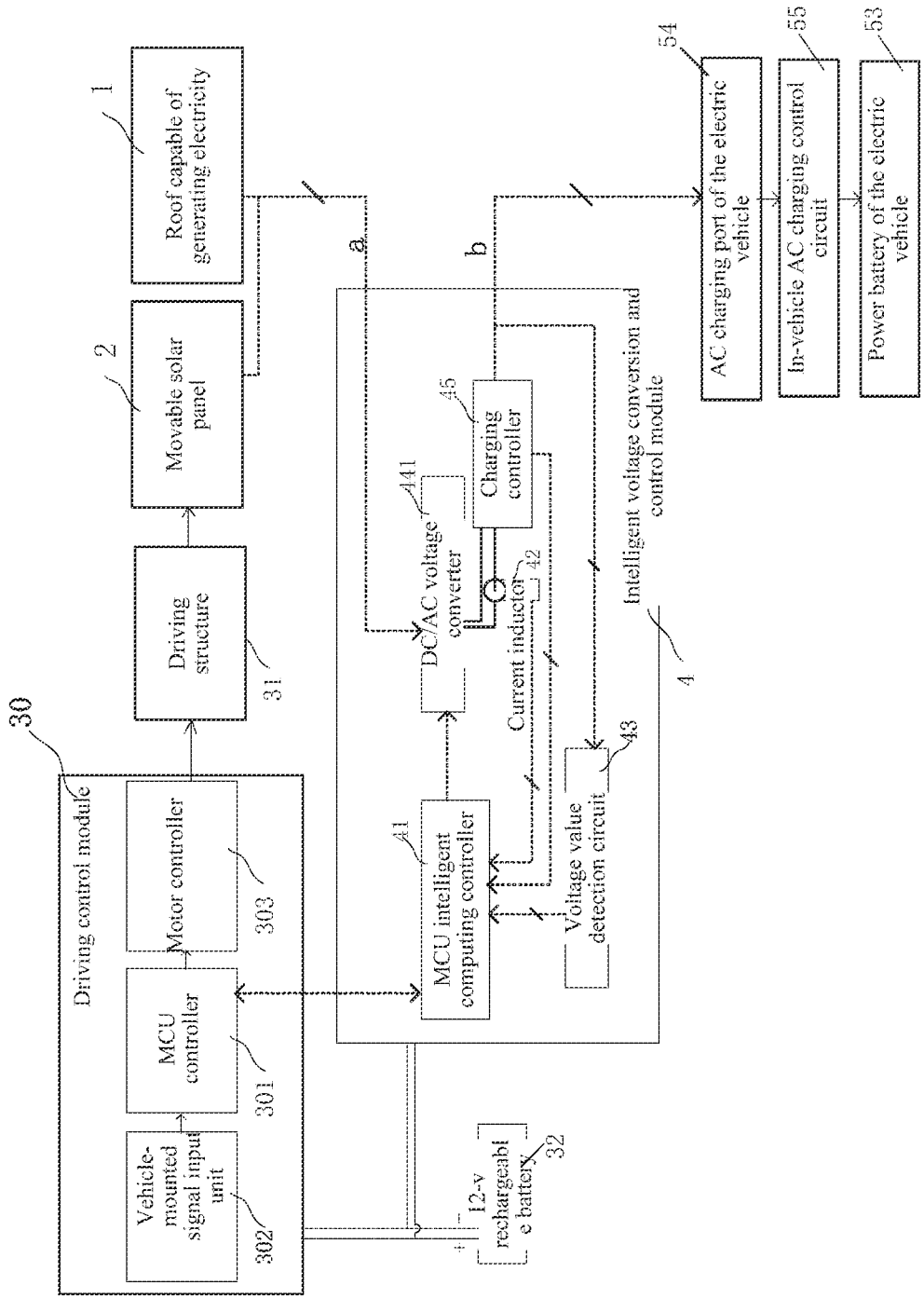
FIG. 6 is a principle topology schematic diagram of the third embodiment of the present invention.
Figure 9:
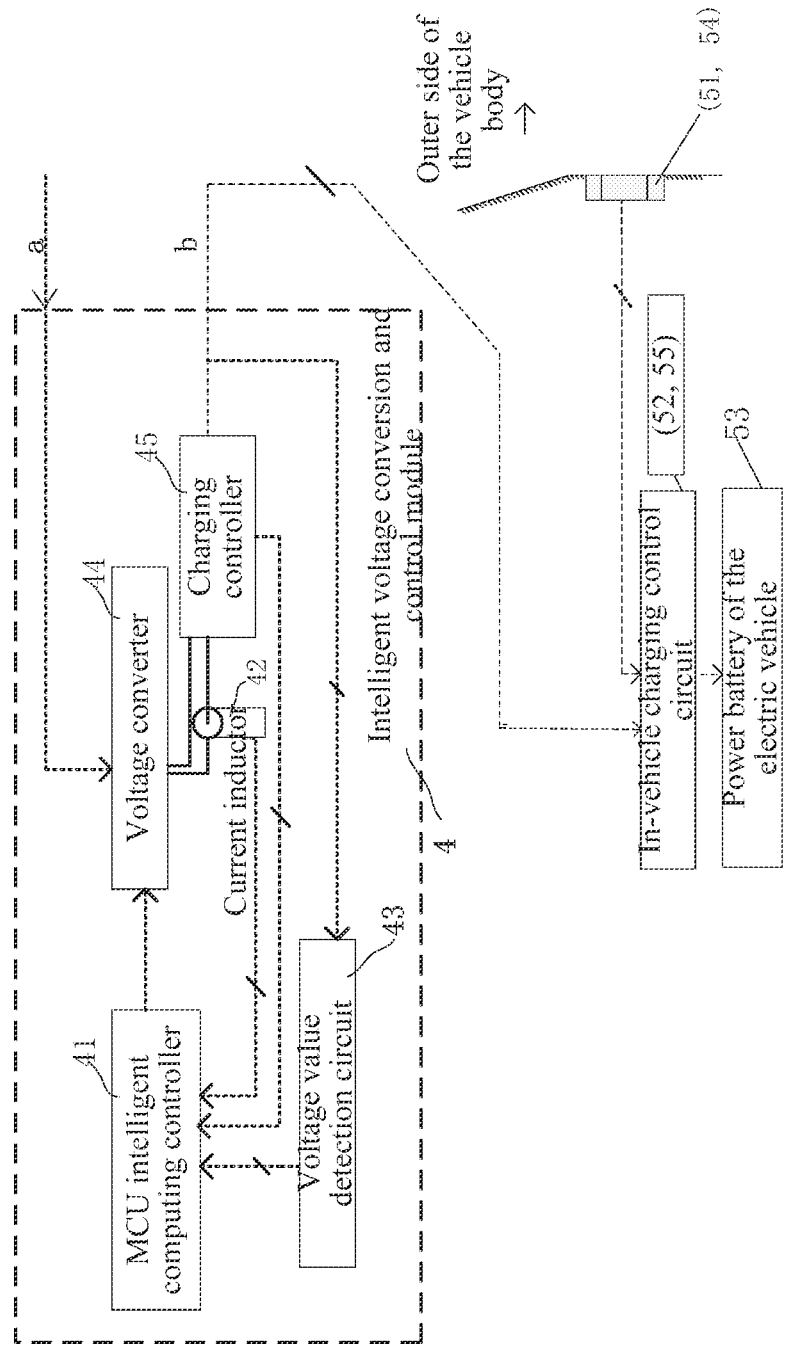

The description of the above structures refers to the specific implementation of the first embodiment. As shown in the structural drawing of FIG. 3 and the principle topology diagram of FIG. 4, a second embodiment of the present invention is different from the first embodiment in that the voltage output terminal of the intelligent voltage conversion and control module is connected to the cathode and/or the cathode of the power battery of the electric vehicle. In the actual production and application, a principle structure of the embodiment shown in FIG. 4 is adopted. The charging controller 45 comprises an on off control function. A voltage output of the voltage converter 440 enters the charging controller 45, and a cathode and/or an anode in the output terminal b of the charging controller 45 is connected to the cathode and/or the anode of the power battery directly. As shown in FIG. 5 and FIG. 6, a third embodiment of the present invention is different from the first embodiment in that the voltage output terminal of the intelligent voltage conversion and control module 4 is connected to an AC charging port of the electric vehicle. During actual production and application, a principle structure of the embodiment shown in FIG. 6 is adopted. A DC/AC voltage converter 441 is used in the voltage converter, and the output voltage enters the charging controller 45. The charging controller 45 comprises the handshake communication and control functions according to the AC charging interface standard of the original vehicle. The output terminal b of the charging controller is connected with the AC charging port 54 of the electric vehicle, that is, the AC slow charging port. The connection mode is as follows: the structure shown in FIG. 7 and FIG. 8 is also adopted, or as shown in FIG. 9, the output terminal b is further connected to an in-vehicle AC charging control circuit module, and integrated into a whole. The charging controller and the connection mode are specifically customized and matched according to protocol standards and handshake control circuits of different electric vehicle manufacturers.

In actual production and application, the electric vehicle mentioned in the present invention comprises pure electric vehicles and gas-electric hybrid vehicles.

The descriptions above are merely preferable embodiments of the present invention, and it should be noted that those of ordinary skills in the art may make a plurality of improvements and decorations without departing from the technical principle of the present invention, and these improvements and decorations shall also be deemed as the protection scope of the present invention.

I claim:

1. An electric vehicle charging system capable of generating electricity by solar energy, comprising a roof (1) capable of generating electricity under illumination, a movable solar panel (2), a solar panel state control device (3), and an intelligent voltage conversion and control module (4), wherein:

the roof (1) capable of generating electricity under illumination has elongated outlets at a front side and a rear side of the vehicle, and the movable solar panel (2) is mounted below the roof (1) capable of generating electricity, and is pushed out from the elongated outlets and extends to the front side and the rear side of the vehicle when an electricity generation area is expanded;

the solar panel state control device (3) is connected to the intelligent voltage conversion and control module (4), is used for receiving a vehicle-mounted signal and a signal of the intelligent voltage conversion and control module (4), and controls a stretched or contracted state of the movable solar panel (2); and output voltages of the roof (1) capable of generating electricity and the movable solar panel (2) are connected in parallel, and the output voltage obtained by the parallel connection is connected to the intelligent voltage conversion and control module (4), a voltage output terminal (b) of the intelligent voltage conversion and control module (4) is connected to a charging port of the electric vehicle or a power battery of the electric vehicle, and the intelligent voltage conversion and control module (4) is used for controlling the solar panel to generate a maximum conversion rate and a maximum charging power under different light intensities at different time periods, is docked with the electric vehicle and controls charging, and monitors a charging process;

wherein, the intelligent voltage conversion and control module (4) comprises a MCU intelligent computing controller (41), a current inductor (42), a voltage value detection circuit (43), a voltage converter (44) and a charging controller (45), the current inductor (42) and the voltage value detection circuit (43) respectively detect a charging current and a charging voltage, and are connected to the MCU intelligent computing controller (41), the MCU intelligent computing controller (41) is connected to the voltage converter (44), an output of the voltage converter (44) is linked with the charging controller (45), and the MCU intelligent computing controller (41) controls the voltage converter (44) to convert and generate different voltages under the same light intensity in the same time period, calculates and memorizes different charging powers and parameters according to a voltage and a current passed pack, selects a parameter corresponding to the maximum power to control an output voltage of the voltage converter, and charges a power battery (53) of the vehicle through the charging controller (45);

the charging controller (45) is a charging controller (45) having handshake communication and control functions according to an interface standard of an original vehicle charging socket, an input terminal of the charging controller (45) is connected to an output terminal of the voltage converter (44), and an output terminal of the charging controller (45) is connected to an original DC charging port (51) of the electric vehicle, or is connected to a cathode or an anode of a power battery (53), or is connected to an AC charging port (54) of the electric vehicle to charge the electric vehicle; the charging controller (45) is also connected to the MCU intelligent computing controller (41), and the MCU intelligent computing controller (41) controls the charging controller (45) to start or stop charging;

the solar panel state control device (3) comprises a driving structure (31) driving the movable solar panel (1) to stretch, contract and translate, a driving control module (30) and a low-voltage 12-v rechargeable battery (32), the driving structure (31) is connected to the driving control module (30), the driving structure (31) is mounted below the roof (1) capable of generating electricity, and the 12-v rechargeable battery (32) is connected to the driving control module (30) and the intelligent voltage conversion and control module (4) respectively, and provides a power supply needed for working;

the driving structure (31) comprises a motor (311) provided with a gear, a trunking guide rail (313) and a transmission rack (312), the driving structure (31) is hidden and fixed below the roof (1) capable of generating electricity, the transmission rack (312) is fixed below two sides of the movable solar panel (2), the motor (311) is fixed below the trunking guide rail, and is meshed with the transmission rack through the gear of the motor, and the motor rotates to drive the movable solar panel (2) to translate along the trunking guide rail (313); and the movable solar panel (2) is divided into a front part and a rear part, each part is composed of a single-layer or multi-layer solar panel, and has a single-layer structure or a multi-layer superimposed structure; the roof (1) capable of generating electricity under illumination has a layer of wafers capable of receiving light energy to generate electricity on an outer surface through a customized laminating process, and is used for absorbing light energy to generate electricity; and voltage output terminals of the roof (1) capable of generating electricity and the movable solar panel (2) are respectively connected in series with a diode to prevent a current from flowing backwardly.

2. The electric vehicle charging system capable of generating electricity by solar energy according to claim 1, wherein the voltage converter (44) is a DC/DC voltage converter (440) or DC/AC voltage converter (441), is controlled by the MCU intelligent computing controller (41), and is capable of outputting a continuously adjustable voltage.

3. The electric vehicle charging system capable of generating electricity by solar energy according to claim 1, wherein the driving control module (30) comprises a vehicle-mounted signal input unit (302), a MCU controller (301) and a motor controller (303), the MCU controller (301) is connected to the vehicle-mounted signal input unit (302), and is used for receiving a signal instruction of the vehicle related to charging, the MCU controller (301) is connected to the MCU intelligent computing controller (41), and is used for receiving charging state information, and the motor controller (303) is connected to the MCU controller (301) and the driving structure (31) respectively.

* * * * *